L. H. BERG.
DEVICE FOR PREVENTING WATER LEADERS FROM FREEZING.
APPLICATION FILED MAY 4, 1912.
1,096,091.                                                                 Patented May 12, 1914.
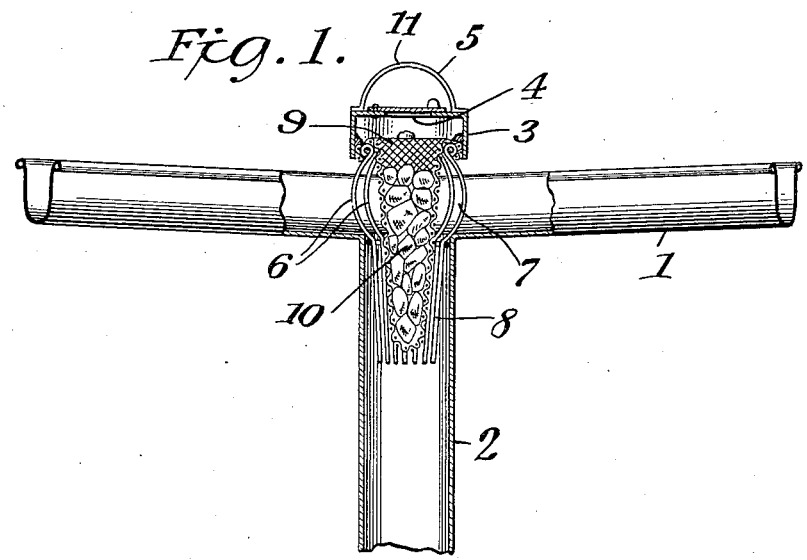
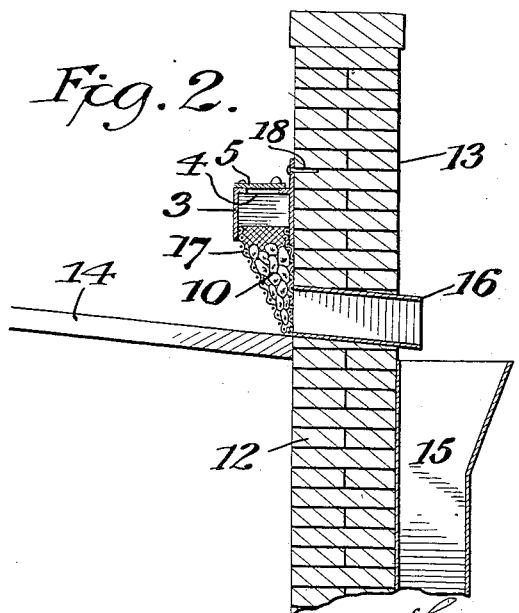

UNITED STATES PATENT OFFICE.

LEWIS H. BERG, OF NEW YORK, N. Y.

DEVICE FOR PREVENTING WATER-LEADERS FROM FREEZING.

1,096,091.

Specification of Letters Patent.  Patented May 12, 1914.

Application filed May 4, 1912.  Serial No. 695,088.

*To all whom it may concern:*

Be it known that I, LEWIS H. BERG, a citizen of the United States, and residing at New York, in the county of New York and State of New York, have invented certain new and useful Improvements in Devices for Preventing Water-Leaders from Freezing, of which the following is a specification, such as will enable those skilled in the art to which it appertains to make and use the same.

This invention relates to means or devices for preventing leaders or discharge pipes of eaves troughs, roof drains and the like from freezing, and the object thereof is to provide an improved device of this class which is simple in construction and operation, and which may be easily applied in different places for the purpose specified.

The invention is fully disclosed in the following specification of which the accompanying drawing forms a part, in which the separate parts of my invention are designated by suitable reference characters in each of the views, and in which:—

Figure 1 is a side view of an eaves trough and showing part of a leader pipe connected therewith and the application of my improvement thereto, part of the construction being in section, and Fig. 2 a sectional view showing another method of applying or using my improvement and showing a modified form thereof.

In the drawing forming part of this specification I have shown an ordinary eaves trough 1 provided with a drain pipe or leader 2, and in the practice of my invention I provide a box-shaped casing 3 which may be circular in form, as indicated in Fig. 1, or rectangular in form, as indicated in Fig. 2, and said casing is open at the bottom, and the top thereof is provided with an aperture 4 closed by a pivoted door 5 which may be rotated for the purpose of opening and closing the aperture 4. In the construction shown in Fig. 1 the bottom of the casing is provided with a plurality of depending wires or rods 6 forming a supplemental casing 7 which is approximately circular in cross section, and which is provided with a downwardly directed tapered extension 8 formed by extending the wires or rods 6. Suspended in the supplemental casing 7 is an open work or wire work receptacle 9 which is also preferably tapered and the top of which is open, and the bottom of which extends approximately to the bottom of the extension 8 of the supplemental casing 7, and in practice, or in the use of this device, the downwardly directed extensions 8 of the supplemental casing 7 are inserted into the upper end of the leader pipe 2, as shown, and is filled with rock-salt 10 through the aperture 4 in the top of the casing 3. The device, as shown in Fig. 1, is also provided with a handle 11 by which it may be manipulated, and when the said device is in use the water in the trough 1, as it is discharged into the leader pipe 2, comes in contact with the salt 10 and this prevents the freezing of the water in said leader pipe.

My invention is not limited to the exact construction thereof, as shown in Fig. 1. The supplemental casing 7 and the depending extensions 8 thereof may be composed of any desired open work material, or of perforated sheet metal, and other changes in and modifications of this form of my improvement may be made, without departing from the spirit of my invention or sacrificing its advantages.

In Fig. 2 I have shown at 12 one wall of a house provided with a top fire guard or wall 13, and on one side of said wall is shown at 14 a part of a roof construction, and on the other side a leader or drain pipe 15, and passing through the wall 12 above the roof construction is a supplemental drain pipe or leader 16 through which the water flows from the roof into the leader or drain pipe 15, and in this form of construction my improved device for preventing the freezing of water in leader pipes is applied to the inner end of the supplemental pipe 16. In this form of construction the casing 3 is preferably angular in horizontal section and is provided with a downwardly directed extension or supplemental casing 17 composed of perforated or wire mesh material and the supplemental casing 17 is preferably tapered, and when the device is secured to the wall, as shown at 18, one side thereof extends downwardly and covers the entrance into the supplemental pipe 16, and in practice the supplemental casing 7 is filled with rock-salt as shown at 10, through the aperture 4 in the casing 3. With this form of construction the water on the roof passes through the bottom of the supplemental casing 17, and through the pipe 16 and this prevents the freezing of said water in both the pipes 15 and 16.

The construction shown in Fig. 2 may also be modified, and other forms of my improvement may be provided within the scope of the appended claim.

Having fully described my invention what I claim as new and desire to secure by Letters Patent is:—

A device for preventing the freezing of water in a drain pipe comprising a casing open at the bottom and provided with a movable cover, the bottom of said casing being provided with a downwardly directed extension composed of open work material and adapted to receive salt, said device being independent of the drain pipe, but adapted to be supported in connection therewith so that the downwardly directed extension will close the end of the drain pipe.

In testimony that I claim the foregoing as my invention I have signed my name in presence of the subscribing witnesses this 3rd day of May 1912.

LEWIS H. BERG.

Witnesses:
S. ANDREWS,
C. MULREANY.

---

Copies of this patent may be obtained for five cents each, by addressing the "Commissioner of Patents, Washington, D. C."